United States Patent [19]

Hochgraf

[11] Patent Number: 5,526,458
[45] Date of Patent: Jun. 11, 1996

[54] VISION SYSTEM WITH FIBER OPTIC PLATE TO DETILT OBLIQUE IMAGES

[75] Inventor: Neil A. Hochgraf, Rochester, N.Y.

[73] Assignee: Eastman Kodak Company, Rochester, N.Y.

[21] Appl. No.: 250,149

[22] Filed: May 27, 1994

[51] Int. Cl.[6] .................................... G02B 6/08
[52] U.S. Cl. ............................. 385/120; 250/227.28
[58] Field of Search ................ 385/120; 250/227.11, 250/227.23, 227.26, 227.28, 227.29

[56] References Cited

U.S. PATENT DOCUMENTS

| | | | |
|---|---|---|---|
| 4,099,833 | 7/1978 | Tosswill | 385/120 |
| 4,492,424 | 1/1985 | Clegg | 385/120 |
| 4,867,530 | 9/1989 | Sedlmayr | 385/120 |
| 4,943,157 | 7/1990 | Reding | 356/1 |
| 5,010,241 | 4/1991 | Butterworth | 235/462 |
| 5,032,023 | 7/1991 | Schneiter | 356/1 |
| 5,102,226 | 4/1992 | Yoshimura et al. | 356/376 |
| 5,164,603 | 11/1992 | Hartman et al. | 250/272 |
| 5,347,122 | 9/1994 | Ansorge et al. | 385/120 |

FOREIGN PATENT DOCUMENTS

| | | | |
|---|---|---|---|
| 164527 | 11/1905 | Germany . | |
| 3200148 | 10/1982 | Germany | 385/120 |
| 0140673 | 11/1981 | Japan | 385/120 |

*Primary Examiner*—Rodney B. Bovernick
*Assistant Examiner*—Robert E. Wise
*Attorney, Agent, or Firm*—Charles E. Snee, III

[57] ABSTRACT

A light directing element (22) used in a Scheimpflug system (10, 12, 14, 16, 18) includes an array of closely packed optical fibers (40) formed as a plate (34) having essentially parallel entrance and exit sides (36, 38), the axis (44) of each fiber of the array being essentially perpendicular to the exit side and at a first oblique angle ($\gamma$) to a normal to the entrance side, the normal to the entrance side being at a second oblique angle ($\alpha$) to the first axis; so that, each fiber receives light from the first optical system, each fiber being curved between the entrance and exit sides. Oblique objects can be viewed in real time using electronic detectors (28–32) which receive light emitted from the exit side. Objects with topographical features (11) may be viewed by providing the entrance side with an optically conjugate surface of topography (23).

16 Claims, 2 Drawing Sheets

VISION SYSTEM WITH FIBER OPTIC PLATE TO DETILT OBLIQUE IMAGES

TECHNICAL FIELD

The invention relates to electronic vision systems. More particularly, the invention concerns machine vision systems for viewing objects at oblique angles, the light reflected from the object being redirected into a path essentially perpendicular to the surface of an image plane.

BACKGROUND ART

Preferably, the plane of an object to be photographed or viewed should be essentially perpendicular to the optical axis of the camera or viewing system; and the image plane should be perpendicular to the same optical axis. In a variety of applications, though, this preferred geometry can be maintained only with great difficulty and inconvenience. Examples would be photographing tall buildings from ground level or viewing objects from a small oblique angle to the object plane, where the object plane is tilted considerably relative to both the optical axis and the image plane. Acceptable focus of all parts of the image may not be attainable.

An early solution to this type of problem is found in German Patent 164,527, granted to Theodor Scheimpflug, who discovered that well-focused images could be obtained under such circumstances if the object and image planes were made to intersect with plane of the optical system (lens) on a common straight line. The general arrangement of a Scheimpflug viewing system is shown in FIG. 1. An obliquely tilted object plane 10 is viewed through a first optical system such as a lens 12, which has an axis 14 forming an oblique angle with object plane 10. The plane 16 of lens 12 is essentially perpendicular to axis 14 in the illustrated system but could also be at an oblique angle. An image plane 18 forms an angle of incidence $\alpha$ between axis 14 and a normal to the image plane. Scheimpflug taught that a good image could be formed at image plane 18, provided that object plane 10, lens plane 16 and image plane 18 intersect along a common line 20. Thus, photographic film placed at image plane 18 could be exposed to produce a good image of an object at plane 10. Photographic film is especially suited for use in Scheimpflug systems since film can be made large enough to accommodate most images and will capture images using incident light at very large angles of incidence approaching parallel to the surface of the film.

In various more modem vision systems, however, real time observation of an object is desired, such as the condition of a product or machine pan during performance of an industrial process. Often, access to the object to be viewed is rather severely limited, which may require use of viewing angles of only several degrees from the plane defined by the object. While a Scheimpflug system can be applied in such situations with acceptably good results when conventional photographic film is exposed at the to image plane, difficulties arise when real time measurements are desired using an electronic detector such as a CCD array or the like, including camera tubes. Such detectors typically are rather small, making it difficult to capture an entire image of the object. In addition, such detectors rather typically are recessed within a camera housing or an integrated circuit housing, thus requiring a rather small angle of incidence (45° maximum) or an unusually large, very expensive detector to provide sufficient area to receive light from the object. Furthermore, optical anti-reflection coatings commonly used on such detectors are generally designed for nearly normal incident light, not very oblique light such as would be received in systems similar to that of FIG. 1.

Thus, a need has existed for a simple, inexpensive device for redirecting light received from the object at the image plane in a Scheimpflug type system; so that the light can be relayed to an electronic detector along an axis more nearly normal to the surface of the detector.

SUMMARY OF THE INVENTION

The invention is defined by the appended claims. In one embodiment, a vision system includes a first optical system for receiving light reflected, scattered or diffracted from an object to be viewed, the first optical system having a first axis. A light directing member according to the invention is provided for receiving light from the first optical system. The light directing member includes an array of closely packed optical fibers formed as a plate having essentially parallel entrance and exit sides, the axis of each fiber of the array being (i) essentially perpendicular to the exit side but (ii) at a first oblique angle to a normal to the entrance side. The normal to the entrance side is set at a second oblique angle to the first axis; so that, each fiber receives light from the first optical system. Between the entrance and exit sides, each fiber is gently curved. An electronic detector is positioned for receiving light emitted from the exit side of the light directing member. The detector produces electrical signals in response to the received light. The light directing member may form a window directly in front of the detector, without any intervening relay lenses.

Preferably, the object to be viewed defines an object plane; the first optical system comprises a lens defining a lens plane transverse to the first axis; the entrance side defines a first image plane; and the object plane, lens plane and first image plane, when extended, intersect on a common line, to satisfy the Scheimpflug conditions. A second optical system may be provided for relaying light from the light directing member to the detector, the second optical system having a second axis essentially perpendicular to the exit side and the detector defining a second image plane essentially perpendicular to the second axis. For efficient transmission of light through the light directing member, the light received from the first optical system at the entrance side preferably is refracted initially by each fiber into an acceptance cone defined for the fiber at a plane perpendicular to the axis of the curved portion of the fiber. The invention also comprises a method of viewing an object using such a light directing member.

The light directing member may be made in accordance with the invention by forming a closely packed bundle of optical fibers, the bundle having an axis and first and second ends; holding the first end of the bundle to prevent substantial relative movement of the fibers at the first end; holding the second end of the bundle to prevent substantial relative movement of the fibers at the second end; relatively moving the first and second ends of the bundle transverse to the axis to doubly carve the optical fibers within the bundle; and finally fuzing or curing the bundle to maintain the double curve. By transversely cutting the bundle near the center of the double curve, two light directing members can be formed, each comprising an array of closely packed optical fibers formed as a plate having essentially parallel entrance and exit sides, the axis of each fiber of the array being essentially perpendicular to the exit side and at an oblique angle to a normal to the entrance side, so that each fiber receives light along the first axis and emits light along the second axis, each fiber being curved between the entrance and exit sides.

An alternative method of making the light directing member comprises forming a closely packed bundle of optical fibers, the bundle having an axis and first and second ends; holding the first end of the bundle to prevent substantial relative movement of the fibers at the first end; frictionally engaging a plate with the ends of the fibers at the second end; relatively moving the first end of the bundle and the plate transverse to the axis to singly curve the optical fibers within the bundle; and finally fuzing or curing the bundle to maintain the single curve. By suitably polishing the ends of the fibers at both ends of the bundle, the light directing member is completed.

The invention provides numerous advantages. Real time viewing of objects whose object plane is quite oblique to the available viewing axis is achieved using modern electronic detectors which otherwise would not be well suited for such applications. The light directing member of the invention can be made using a small volume of conventional fiber optic elements and a simple assembly method. The member can be light weight and thin and is easily mounted like a lens. The optimum position within a given optical system is easily determined.

BRIEF DESCRIPTION OF THE DRAWINGS

The foregoing and other features and advantages of the invention will be apparent from the following more particular description of the preferred embodiments of the invention, as illustrated in the accompanying drawings.

DESCRIPTION OF THE PREFERRED EMBODIMENTS

Figure 1:
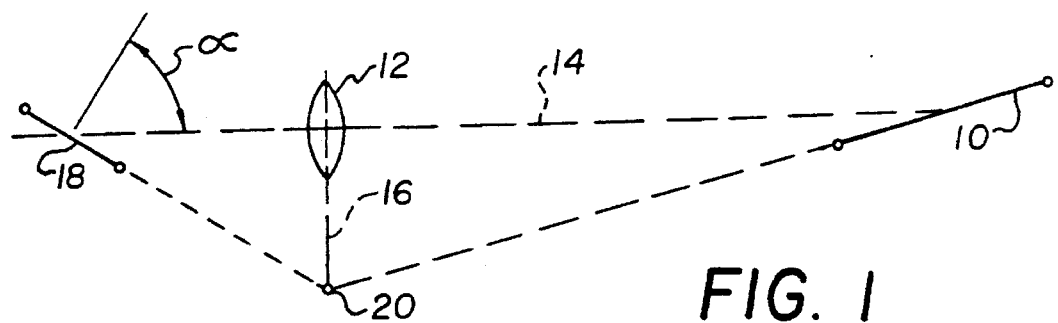
FIG. 1 illustrates schematically a prior art imaging system of the general type taught by Scheimpflug.

The following is a detailed description of the preferred embodiments of the invention, reference being made to the drawings in which the same reference numerals identify the same elements of structure in each of the several Figures.

Figure 2:
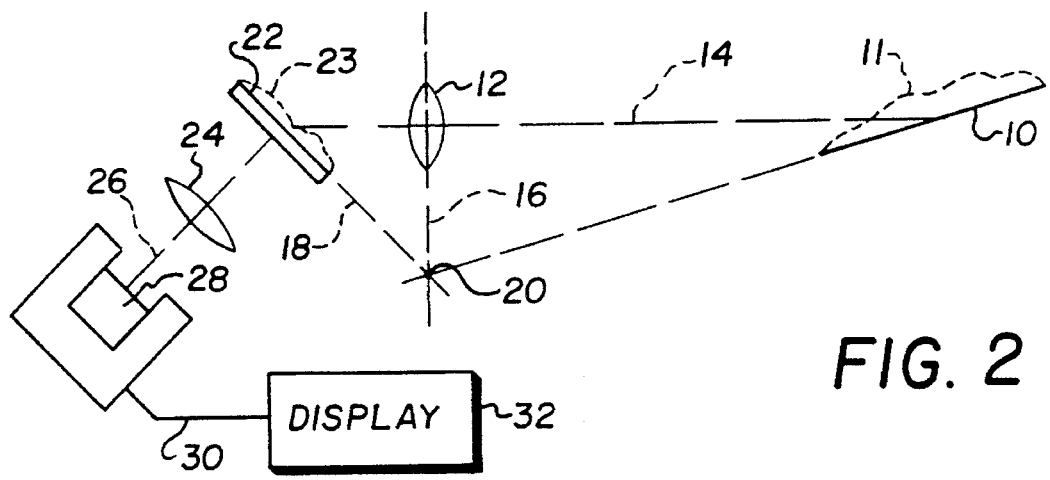
FIG. 2 illustrates a vision system according to the present invention.

FIG. 2 illustrates a vision system suitable for a wide variety of applications in which an object can be viewed conveniently only from a rather small oblique angle. A light directing member 22 according to the invention is positioned at image plane 18 of a Scheimpflug type imaging system. Object plane 10 is illuminated by suitable means not illustrated. Member 22 causes the light from lens 12 to be redirected to a second optical system which may comprise a lens 24 with an axis 26 essentially perpendicular to member 22. Light passing through lens 24 falls essentially normally on a conventional electronic detector 28, such as a CCD array. The second optical system may be configured to magnify or reduce the size of the image to detector 28. In the familiar manner, detector 28 produces electrical signals in response to the received light and passes the signals over a suitable cable 30 to a suitable display 32 which may comprise a computer-based image processor. Thus, as the conditions at object plane 10 change, they can be observed and processed in real time by display 32. Alternatively, member 22, lens 24 and detector 28 can be set at angles to axis 26 which will establish a second Scheimpflug system. The benefit of such a second Scheimpflug system would be to reduce distortion of the image at detector 28.

Figure 3:
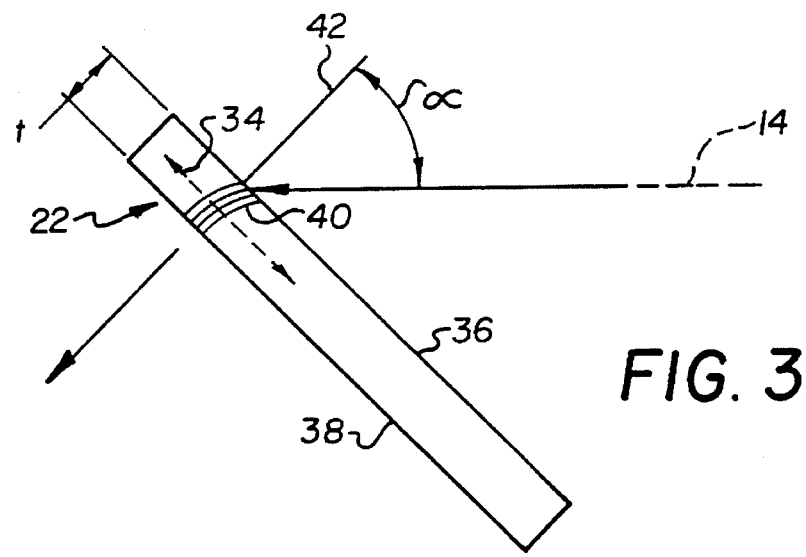
FIG. 3 illustrates the unique light directing member according to the invention.
Figure 4:
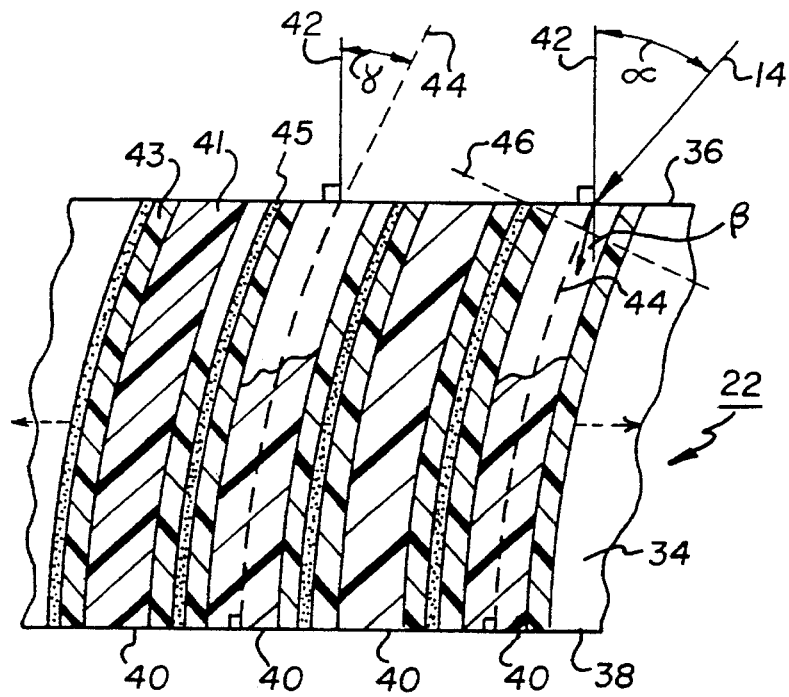
FIG. 4 illustrates a fragmentary portion, partially in section and partially broken away, of the light directing member of FIG. 3 and indicates the geometric relationships of the various elements of the member.

As seen in FIGS. 3 and 4, light directing member 22 has the form of a plate 34 with an essentially planar light entrance side 36 and, essentially parallel to entrance side 36, an essentially planar light exit side 38. To satisfy the Scheimpflug conditions, entrance side 36 should be essentially coplanar with image plane 18. By "essentially" planar or coplanar or parallel is meant that the sides of member 22 may deviate somewhat from planarity or coplanarity or parallelism, without departing from the scope of the invention, to the extent that the image can be tolerated to be out of focus. For example, an object having a surface 11 with topographical features as shown in phantom lines in FIG. 2 may be imaged in accordance with the invention by grinding or otherwise treating member 22 to provide at entrance side 36 an optically conjugate surface 23 for the magnification of lens 12, as also shown in phantom lines in FIG. 2, with an obliquity which meets the Scheimpflug conditions.

Member 22 is formed from an array of closely packed, fuzed optical fibers 40, such as commercially available fibers preferably having diameters in the 3 to 4 micron range, which will provide approximately 50 line pairs per millimeter resolution. Thus, resolution at the detector when using member 22 is good, particularly when lens 12 enlarges the image at side 36 and lens 24 reduces the image at the detector. As shown in FIG. 4, each fiber 40 comprises a central core 41 surrounded by a layer of cladding 43 in the familiar manner. Among the fibers, a conventional bonding material 45 such as a resin or low melting point glass falls the interstices and, when cured or fuzed, holds the array together. Such resolution is better than most CCD detectors, which typically have pixel sizes of about 7 to 14 microns in width. Member 22 may have any convenient geometry on its perimeter, such as round or rectangular; so long as sufficient area is provided on entrance side 36 for receiving the light imaged by lens 12. The area of member 22 need only equal that of the oblique image and usually must be rectangular. Large image area at side 36 should ensure that the object can be seen better in its spatial context.

As seen best in FIG. 4, a normal 42 to entrance side 36 forms an oblique angle γ with a central, longitudinal axis 44 of each fiber; but axis 44 is essentially perpendicular to exit side 38 which preferably is essentially normal to axis 26, as shown in FIG. 2. The ends of the fibers at sides 36, 38 preferably should be polished to be essentially coplanar at the respective surfaces. Typically, angle γ should be in the range of 30 to 40° toward axis 44 for modem high index glasses of the types used in conventional optical fibers. Between sides 36 and 38, each fiber curves gently and for most applications, all fibers will have the same curvature. The fibers all curve in the same direction, rather like stalks of wheat bent by the wind to one side. A single curve within the thickness of the plate is preferable; however, multiple or compound curves may be used provided the curvatures are not too sharp. The overall thickness t of member 22 is not critical but must be sufficient to permit the fibers to be curved to the desired final position without unacceptable light loss. For example, for a 30° tilt of the fibers and a bend radius of about 8.0 mm, a plate thickness of about 4.0 mm would be sufficient. Of course, the thicker the plate, the greater will be the cost of the fibers. Short bend radii of the fibers increase the cone angle of exiting light, even if the entering light was parallel and right down the axis of the fiber at the entrance side.

For best efficiency of transmission of light along each fiber, angle of incidence $\alpha$ between normal 42 and optical axis 14 should be held within a range, giving due account to the indices of refraction of the materials of the core and cladding of the fibers, to provide a suitable angle of refraction $\beta$ within each fiber. That is, the light received from the first optical system at entrance side 36 preferably should be refracted initially by each fiber into an acceptance cone defined for the fiber at a plane 46 perpendicular to axis 44 within the curved portion of the fiber. When the light refracts from side 36 into such an acceptance cone, even though the fibers are curved within element 22, the light losses will be minimized and light will leave the fibers essentially perpendicular to surface 38 as small, compact beams which ensure good resolution. For optimum efficiency, the cone of the entering light should be within the cone angle at which the fiber can efficiently receive and transmit light. Preferably, the cone of the exiting light should be within the f number subtended by the following relay optics, such as lens 24; so that, the lens will be able to accept essentially all of the light from the exit side. Angles of incidence $\alpha$ as high as 80° to 89° can be accommodated. The tilt angle $\gamma$ of the fibers for very wide image field angles may be varied across the plate as necessary to ensure that incident light will stay within the acceptance cone of the fibers. Preferably, the light passing along fibers 40 should experience several tens of reflections, to ensure a more uniform output at side 38 and just to fill the entrance pupil of any following relay optics, such as lens 24. Due to the curve provided in fibers 40 in accordance with the invention, angle of incidence $\alpha$ may be as large 80 to 85 degrees, so that incident light just skims entrance side 36, yet good transmission through element 22 to detector 28 would be expected.

Figure 5:
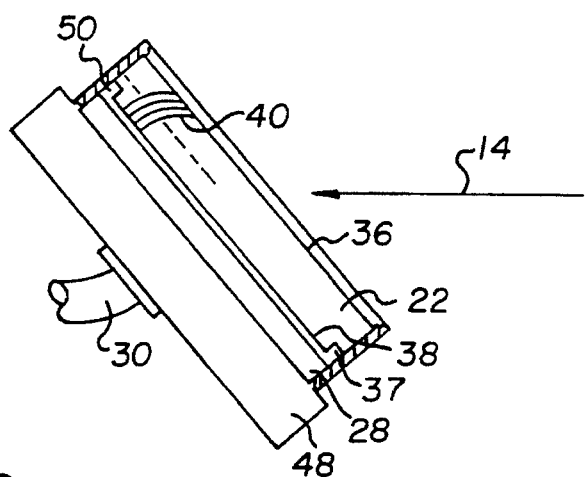
FIG. 5 illustrates an alternative application of the light directing member.

Light directing element 22 may be provided before a second optical system as shown in FIG. 2, or may be positioned directly in front of the detector, in contact or near contact, as illustrated in FIG. 5. When a second optical system is not necessary, a housing 48 may be provided for detector 28 and a tube or barrel 50 may be included to recess and protect the detector in the familiar manner. In this instance, member 22 may be mounted directly within barrel 50 just in front of detector 28. Member 22 may be in contact with detector 28 or the light may be imaged onto the detector by self-focusing optical fibers. The approach to use may be readily determined to provide best resolution and to allow appropriate clearance for any wiring or other features of the detector. A peripheral notch 37 may be provided adjacent exit side 38 to facilitate wiring to the detector.

Figure 6:
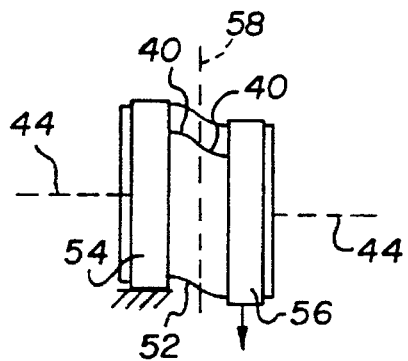
FIG. 6 and FIG. 7 illustrate schematically alternative methods for making the light directing member.
Figure 7:
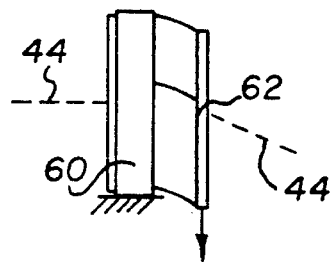

FIGS. 6 and 7 illustrate schematically a pair of methods suitable for making light directing element 22. A bundle 52 of closely packed optical fibers is provided whose perimeter geometry is suitable for an intended application. A first end of the bundle is held by a fixed clamp 54 to prevent substantial relative movement of the fibers at the first end. The second end of the bundle is held by a movable clamp 56, also to prevent substantial relative movement of the fibers at the second end. The first and second ends of the bundle are then moved relative to one another along essentially parallel paths transverse to axis 44 to doubly curve the optical fibers within the bundle, as shown in FIG. 6. Finally, the bundle is fuzed or cured using conventional techniques, to maintain the double curve. By transversely cutting the bundle along a cut line 58 near the center of the double curve and polishing the both ends of each of the severed parts of the bundle, two light directing members 22 are formed.

An alternative method of making light directing member 22 comprises forming a closely packed bundle of optical fibers; holding a first end of the bundle with a fixed clamp 60 to prevent substantial relative movement of the fibers at the first end; frictionally engaging a movable plate 62 with the ends of the fibers at a second end; relatively moving the first end of the bundle and the plate transverse to axis 44 to singly curve the optical fibers within the bundle; and finally fuzing or curing the bundle to maintain the single curve. By suitably polishing the ends of the fibers at both ends of the bundle, the light directing member is completed.

While my invention has been shown and described with reference to particular embodiments thereof, those skilled in the an will understand that other variations in form and detail may be made without departing from the scope and spirit of my invention.

PARTS LIST

10 . . . object plane
11 . . . topographical features of object
12 . . . lens
14 . . . axis of lens 12
16 . . . plane of lens 12 transverse to 14
18 . . . image plane
20 . . . common line of intersection of 10, 16, 18
22 . . . light directing member according to invention
23 . . . optically conjugate surface
24 . . . lens
26 . . . axis of 24
28 . . . detector
30 . . . suitable conductor or cable
32 . . . video display or image processor
34 . . . plate
36 . . . light entrance side
37 . . . peripheral notch
38 . . . light exit side
40 . . . optical fibers
41 . . . core of 40
$\gamma$ . . . angle between normal 42 and axis of fiber 40
42 . . . normal to side 36
43 . . . cladding of 40
44 . . . axis of fiber 40
45 . . . bonding material
$\alpha$ . . . angle of incidence
$\beta$ . . . angle of refraction
46 . . . plane normal to axis 44
48 . . . housing for detector 28
50 . . . tube or barrel
52 . . . bundle of optical fibers 40
54 . . . fixed clamp
56 . . . movable clamp
58 . . . cut line
60 . . . fixed clamp
62 . . . movable frictionally engaged plate

Having thus described my invention in sufficient detail to enable those skilled in the art to make and use it, I claim as new and desire to secure Letters Patent for:

1. A vision system, comprising:
 a first optical system (12) for receiving light reflected from an object plane (10) to be viewed, the first optical system having a first axis (14), the first optical system defining a system plane (16) transverse to the first axis;

a light directing member (22) for receiving light from the first optical system, the light directing member including an array of closely packed optical fibers (40) formed as a plate (34) having essentially parallel entrance and exit sides (36,38), a central axis (44) of each fiber of the array being (i) essentially perpendicular to the exit side and (ii) at a first oblique angle (γ) to a normal (42) to the entrance side, the normal to the entrance side being at a second oblique angle or incidence (α) to the first axis, the angles (γ, α) being selected so that light from the first optical system is refracted into the acceptance cone of each fiber, each fiber being curved between the entrance and exit sides and the acceptance cone being defined for each fiber at a plane perpendicular to the central axis in a curved portion of each fiber; and a detector (28) for receiving light emitted from the exit side of the light directing member and producing electrical signals in response to the received light.

2. A vision system according to claim 1, wherein the detector includes a CCD array and the light directing member forms a window in front of the CCD array, each fiber being self focusing.

3. A vision system according to claim 1, wherein an object to be viewed defines the object plane; the first optical system comprises a lens defining the system plane; the entrance side of the light directing member defines a first image plane; and the object plane, lens plane and first image plane, when extended, intersect on a common line.

4. A vision system according to claim 1, further comprising a second optical system (24) for relaying light from the light directing member to the detector, the second optical system having a second axis (26) essentially perpendicular to the exit side and the detector defining a second image plane essentially perpendicular to the second axis.

5. A vision system to claim 1, wherein the detector includes a CCD array and the light directing member forms a window in front of the CCD array, each fiber being in near contact with a front surface of the array.

6. A light directing member (22) for receiving light along a first axis (14) and emitting light along a second axis (26), comprising:

an array of closely packed optical fibers (40) formed as a plate (34) having essentially parallel entrance and exit sides (36, 38), a central axis (44) of each fiber of the array being essentially perpendicular to the exit side (38) and at an oblique angle (γ) to a normal (42) to the entrance side 36, so that each fiber can receive light along a first axis at an angle of incidence (α) at the entrance side, the angle (γ) being selected so that in use of the member at angle (α), light along the first axis is refracted into an acceptance cone for each fiber and each fiber can emit light along the central, second axis at the exit side, each fiber being curved between the entrance and exit sides and the acceptance cone being defined for each fiber at a plane perpendicular to the central axis in a curved portion of each fiber.

7. A method for viewing an object, comprising the steps of:

illuminating the object, the object defining an object plane (10);

relaying light reflected, scattered or diffracted from the object through a first optical system having a first optical axis (14);

receiving light from the first optical system at an entrance side (36) of an array of closely packed optical fibers (40) formed as a plate (34) having essentially parallel entrance and exit sides (36, 38), a central axis (44) of each fiber of the array being essentially perpendicular to the exit side and at an oblique angle (γ) to a normal (42) to the entrance side, the normal to the entrance side being at a second oblique angle of incidence (α) to the first optical axis, the angles (γ, α) being selected so that light along the first axis is refracted into an entrance cone for each fiber and emitted from the exit side along the central axis, each fiber being curved between the entrance and exit sides and the acceptance cone being defined for each fiber at a plane perpendicular to the central axis within the curved portion of each fiber;

relaying light emitted from the exit side to a detector (28) for received light; and producing with the detector electrical signals in response to the received light.

8. A method according to claim 7, wherein the first optical system comprises a lens (12) defining a lens plane (16) transverse to the first axis; and the entrance side defines a first image plane (18), further comprising the steps of:

orienting the object plane, lens plane and first image plane so that the planes, when extended, intersect on a common line.

9. A method according to claim 7, wherein the step of relaying light emitted comprises a step of passing the emitted light through a second optical system having a second axis essentially perpendicular to the exit side; and the detector defines a second image plane; further comprising the step of orienting the second image plane essentially perpendicular to the second axis.

10. A method of making a light directing member, comprising the steps of:

forming a closely packed bundle of optical fibers, the bundle having an axis and first and second ends;

holding the first end of the bundle to prevent substantial relative movement of the fibers at the first end;

holding the second end of the bundle to prevent substantial relative movement of the fibers at the second end;

relatively moving the first and second ends of the bundle transverse to the axis to doubly curve the optical fibers within the bundle; and fuzing the bundle to maintain the double curve.

11. A method according to claim 10, further comprising the step of:

transversely cutting the bundle near the center of the double curve to form two light directing members, each comprising an array of closely packed optical fibers formed as a plate having essentially parallel entrance and exit sides, the axis of each fiber of the array being essentially perpendicular to the exit side and at an oblique angle to a normal to the entrance side, so that each fiber can receive light along a first axis and emits light along a second axis, each fiber being curved between the entrance and exit sides.

12. A method according to claim 11, further comprising the step of:

polishing the ends of the fibers at both ends of the bundle.

13. A method according to claim 11, further comprising the step of:

forming the entrance side to a shape optically conjugate to a shape of an object to be viewed.

14. A method of making a light directing member, comprising the steps of:

forming a closely packed bundle of optical fibers, the bundle having an axis and first and second ends;

holding the first end of the bundle to prevent substantial relative movement of the fibers at the first end;

frictionally engaging a plate with the ends of the fibers at the second end;

relatively moving the first end of the bundle and the plate transverse to the axis to singly curve the optical fibers within the bundle; and fuzing the bundle to maintain the single curve, thereby forming a light directing member including an array of closely packed optical fibers formed as a plate having essentially parallel entrance and exit sides, a central axis of each fiber of the array being (i) essentially perpendicular to the exit side and (ii) at a first oblique angle to a normal to the entrance side, each fiber being curved between the entrance and exit sides.

15. A method according to claim 14, further comprising the step of:

polishing the ends of the fibers at both ends of the bundle.

16. A method according to claim 14, further comprising the step of:

forming the entrance side to a shape optically conjugate to a shape of an object to be viewed.

* * * * *